(12) United States Patent
Boulet et al.

(10) Patent No.: US 8,707,834 B2
(45) Date of Patent: Apr. 29, 2014

(54) DEVICE FOR REPAIR OF DEFECTS IN A STRUCTURE

(75) Inventors: Nicolas Boulet, Colomiers (FR); Laurent Barizza, Plaisance du Touch (FR); Richard Combrouze, Touget (FR)

(73) Assignee: Airbus Operations S.A.S., Toulouse (FR)

( * ) Notice: Subject to any disclaimer, the term of this patent is extended or adjusted under 35 U.S.C. 154(b) by 129 days.

(21) Appl. No.: 13/526,874

(22) Filed: Jun. 19, 2012

(65) Prior Publication Data

US 2012/0321398 A1  Dec. 20, 2012

(30) Foreign Application Priority Data

Jun. 20, 2011 (FR) ...................................... 11 55396

(51) Int. Cl.
*B23D 1/12* (2006.01)
*B23B 29/00* (2006.01)

(52) U.S. Cl.
USPC .............................................. 82/1.2; 407/30

(58) Field of Classification Search
USPC ........... 82/1.2, 82, 83; 407/30, 37, 45, 73, 77; 408/153, 168, 169, 147, 151
See application file for complete search history.

(56) References Cited

U.S. PATENT DOCUMENTS

| | | | | |
|---|---|---|---|---|
| 914,328 A | * | 3/1909 | Barnes | 408/168 |
| 2,247,283 A | * | 6/1941 | Young | 82/1.2 |
| 3,918,826 A | * | 11/1975 | Friedline | 408/154 |
| 4,589,309 A | * | 5/1986 | Nokovich | 82/12 |
| 4,621,549 A | * | 11/1986 | Nokovich | 82/1.2 |
| 2003/0002938 A1 | * | 1/2003 | Maar | 408/168 |
| 2012/0321398 A1 | * | 12/2012 | Boulet et al. | 407/30 |

FOREIGN PATENT DOCUMENTS

| | | |
|---|---|---|
| EP | 1 959 091 A1 | 8/2008 |
| RU | 2 294 262 C1 | 2/2007 |

OTHER PUBLICATIONS

Preliminary Search Report issued Jan. 20, 2012 in French Patent Application No. 1155396 with English translation of categories of cited documents.

* cited by examiner

*Primary Examiner* — Will Fridie, Jr.
(74) *Attorney, Agent, or Firm* — Oblon, Spivak, McClelland, Maier & Neustadt, L.L.P.

(57) ABSTRACT

A device for repairing defects in an internal layer of a structure, for example, an aircraft. The device includes a cylindrical body which rotates around its axial direction, a movement conversion device housed in the cylindrical body and assembled such that it is able to move in the axial direction, a configuration device able to cause the displacement of the conversion device by an axial traveling motion, and a cutting element coupled to the cylindrical body and to the conversion device such that the cutting element is able to be made to rotate by the cylindrical body and to be made to move with a radial displacement by the conversion device between a folded position and a deployed position through an opening defined in the cylindrical body in order to machine the internal layer with a cut which depends on the axial displacement of the conversion device.

13 Claims, 7 Drawing Sheets

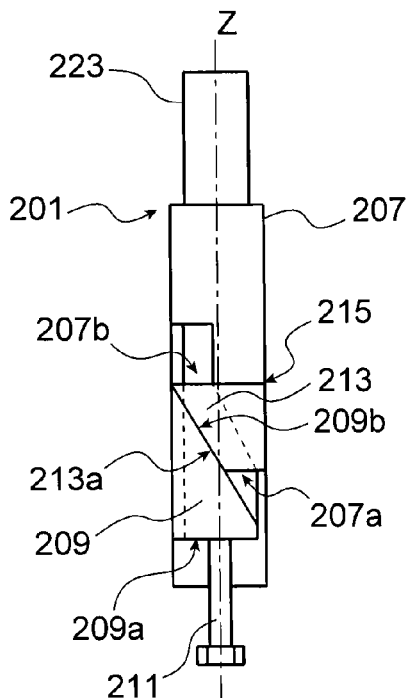
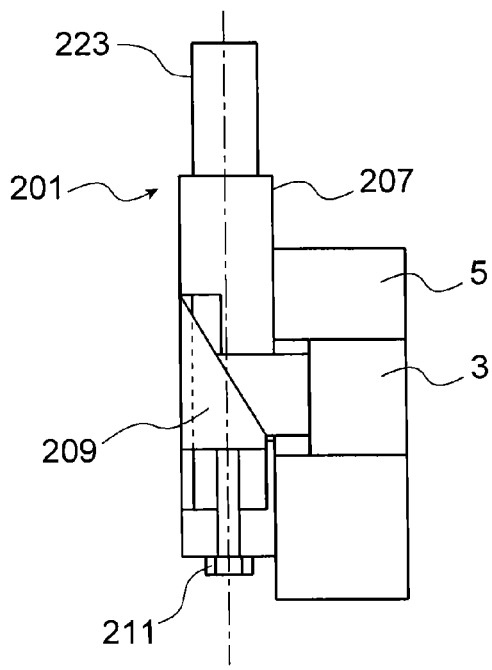
FIG. 5A    FIG. 5B
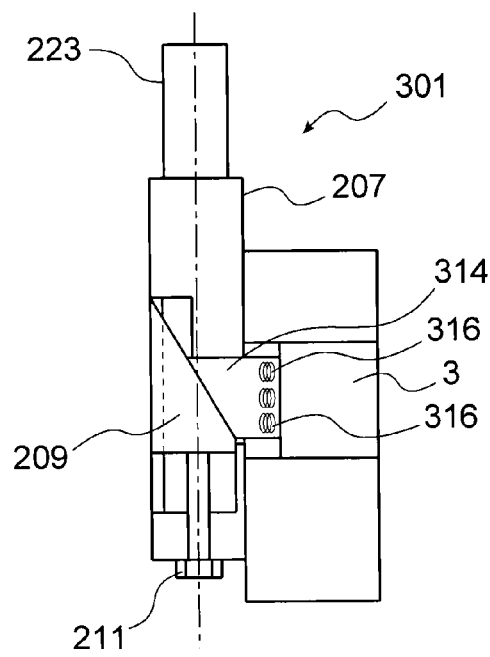
FIG. 6A

DEVICE FOR REPAIR OF DEFECTS IN A STRUCTURE

TECHNICAL FIELD

The present invention relates to the field of repair of defects in a structure, and more specifically for the repair of cracks in an internal layer of the structure of an aircraft.

STATE OF THE PRIOR ART

Detection of defects of the crack, corrosion, delamination or damage type in tubes or structures which are of difficult access poses many problems and often requires that the structures are removed. The type of problem is found in many different industrial fields such as, for example, in the field of air, space, maritime or other transport.

For example, in the aerial field, mechanical structures or parts of aircraft are subject to regular inspections to detect notably the presence of any cracks or other defects in order to make, if required, the appropriate repairs.

However, certain structures or parts can be located in areas where there is no direct access, such as, for example, parts inside an assembly. In certain configurations it is almost impossible to remove the mechanical parts to be inspected and repaired and/or this cannot be accomplished without causing implementation delays and particularly high additional costs.

In other configurations, such as in the joints of wing surfaces, the structures consist of several stacked layers or parts of great thickness.

It sometimes occurs that cracking is detected within an internal or intermediate layer. For example, in the case of a structure consisting of three layers and in the case of small bores of the order of 10 mm, a spot-facing of the first layer and of the intermediate cracked layer is accomplished to eliminate the crack before installing rings. In this case the third layer has a bore of nominal diameter, whereas that of the other layers is of greater diameter.

Thus, by increasing the diameter of the first layer to repair the second, it is possible that at the same time the structural properties of the first layer will be degraded.

Conversely, in the case of large bore diameters 4, typically greater than 25 mm, a rotating tool is currently used with flat bits 6 to make the recess (see FIG. 7). It will be noted that the stack of layers 3 in structure 5 necessarily leads the rotating tool to be very long. Thus, to limit bending during machining, rod 8 or the machining shaft must be approximately 10 mm.

For example, with a bore of 25 mm, a 24 mm diameter rotating tool with a 10 mm diameter rod can be passed, which enables a pocket approximately 6 to 7 mm deep to be created.

However, in the case of holes of small diameter of the order of 10 to 12 mm, a mill or offset cutting tool cannot be used with this type of rotating tool.

The object of the present invention is thus to propose a device for repairing defects or cracks in an internal or intermediate layer of a structure for, for example, an aircraft, resolving the abovementioned disadvantages, and in particular enabling cracks to be repaired in an internal layer from holes the diameter of which is of the order of 10 mm, and without damaging the structural properties of the other layers.

ACCOUNT OF THE INVENTION

The object of the invention is a device for repairing defects in an internal layer of a structure for, for example, an aircraft, where the said device includes:

- a cylindrical body rotating around its axial direction,
- a movement conversion means held in the said cylindrical body, said movement conversion means being assembled constrained to rotate with the cylindrical body, and assembled such that it is able to move in the axial direction,
- a configuration means able to cause and to configure the displacement of said conversion means in an axial translational movement,
- a cutting element coupled with the said cylindrical body and with the said conversion means such that the cutting element may be made to rotate by the cylindrical body, and may be made to move with a radial displacement by the conversion means between a folded position and a deployed position through an opening defined in the said cylindrical body to machine the internal layer with a cut which depends on the displacement of the said conversion means according to an axial translational movement, said cutting element being enclosed in said cylindrical body in its folded position.

Advantageously, the device includes an adjustment means to move the cylindrical body in the axial direction in order to adjust the cutting element to a desired level compared with the internal layer which is to be machined.

One specific characteristic of the present invention is that the configuration means is a configuration part of cylindrical shape, and which may be of variable thickness in the axial direction, and also that the said configuration part is connected to a frame whilst being coupled to the cylindrical body with a sliding connection in the axial direction, where the said conversion means is pushed into contact by means of a punctiform joint with the said configuration part, such that, when it rotates, the conversion means can move with an axial travelling motion in accordance with the shape of the said configuration part.

The device includes an incrementation means intended to move the configuration part in micrometric fashion towards the conversion means in an axial direction, in accordance with the number of turns of the cylindrical body.

According to a first embodiment the conversion means includes:

- a cylindrical pushrod having a first perpendicular base and a second oblique base, where the said cylindrical pushrod is able to slide in a cylindrical housing of complementary shape, delimited on one side by a ceiling which is flat compared with the first base, and on the other side by a flat base with a cavity compared with the second base, where the said cavity is intended to receive a portion of the said cylindrical pushrod, and
- a coupling rod passing through a hole of the said ceiling, the ends of which are in contact firstly with the first base of the cylindrical pushrod, and secondly with the configuration part, where the coupling rod includes a return spring to remain in contact with the cylindrical pushrod and the configuration part.

The cutting element has a first inclined side coupled to the second oblique base of the pushrod by a first sliding connection, and a second perpendicular side supported on the said flat base of the cylindrical housing, and coupled by a second sliding connection to the opening defined in the cylindrical body such that the displacement of the cylindrical pushrod in the axial direction causes a radial displacement of the cutting element between a folded position and a deployed position, or vice versa through the said opening.

Advantageously, the cylindrical body includes a cylindrical rod in the axial direction.

Advantageously, the configuration part is a configuration ring suitable to be placed around the said cylindrical rod.

Advantageously, the configuration ring is of a thickness which can vary relative to the angular coordinates of the ring according to a determined function among one of the following functions: triangle function, sawtooth function, rectangular function, and sine function.

According to a second embodiment, the conversion means is a cylindrical pushrod having a first perpendicular base and a second oblique base, where the said cylindrical pushrod is able to slide in a cylindrical housing of complementary shape, delimited by a base which is flat compared with the first base and a flat ceiling having a cavity compared with the second base, where the said cavity is intended to receive a portion of the said cylindrical pushrod.

According to the second embodiment, the cutting element has a first inclined side coupled to the second inclined base of the pushrod by a first sliding connection, and a second perpendicular side supported on the said flat ceiling of the cylindrical housing and coupled to the opening defined in the cylindrical body by a second sliding connection, such that the displacement of the cylindrical pushrod in the axial direction causes a radial displacement of the cutting element between a folded position and a deployed position, or vice versa through the said opening.

According to the second embodiment, the configuration means is a configuration screw passing through the flat base of the cylindrical housing and making contact with the said cylindrical pushrod such that a rotation of the said screw causes an axial displacement of the said cylindrical body.

The invention also refers to a device according to the second embodiment in which the cutting element is replaced by a part of the same shape including a crack-detection sensor.

BRIEF DESCRIPTION OF THE ILLUSTRATIONS

Other characteristics and advantages of the invention will appear on reading the preferential embodiments of the invention made in reference to the attached figures, among which:

FIGS. 5A and 5B illustrate schematically a crack-repair device according to a second embodiment of the invention;

FIGS. 6A and 6B illustrate schematically a crack-detection device, according to the invention.

DETAILED ACCOUNT OF PARTICULAR EMBODIMENTS

The principle on which the invention is based is to use a device consisting of a rotating shaft having a diameter of the order of the bore, and including a mechanism enabling a cutting tool to be deployed to allow machining in an internal layer without machining the other layers.

Figure 1:
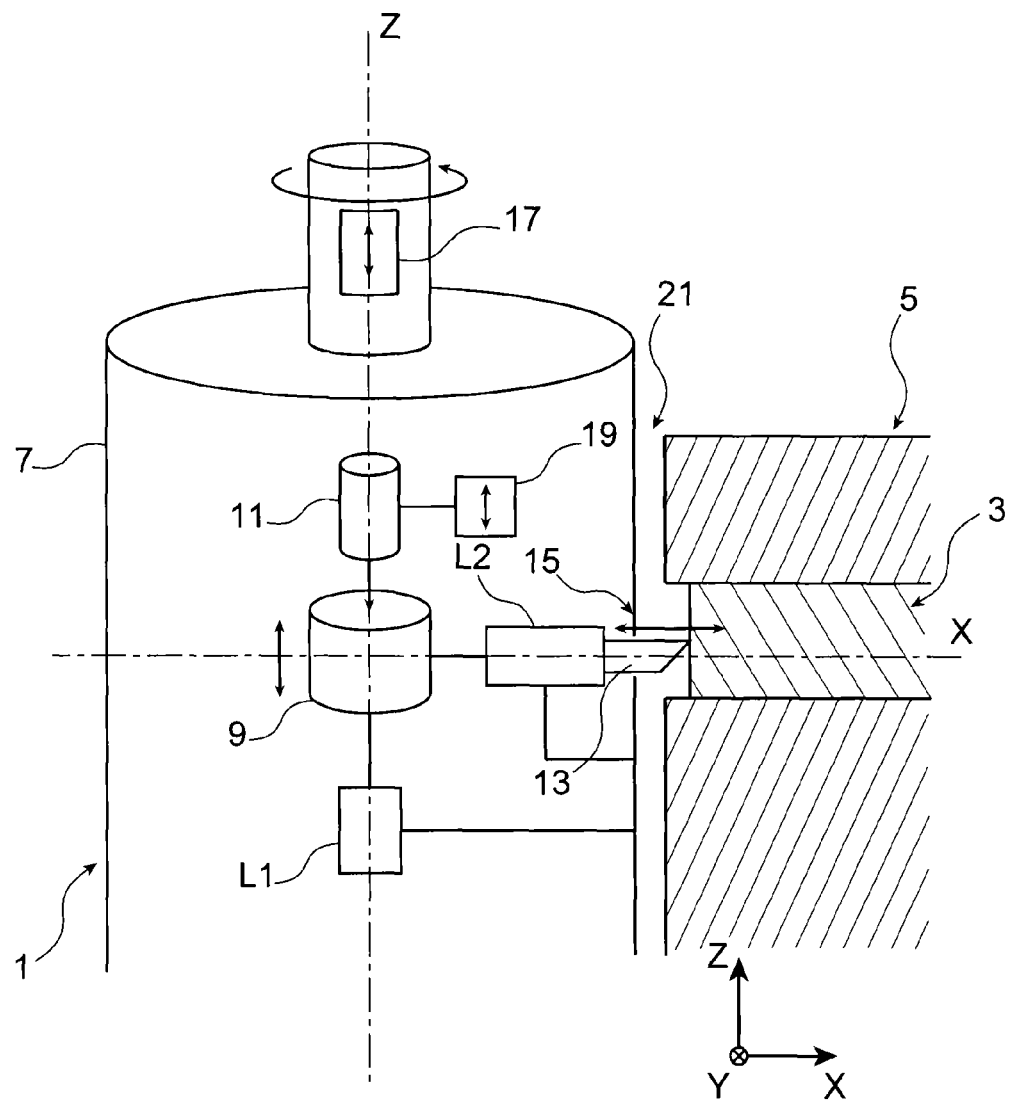
FIG. 1 illustrates very schematically a defect detection device which can be used to repair defects in an internal layer of a structure for, for example, an aircraft, according to the invention.

In accordance with the invention, FIG. 1 illustrates schematically a device 1 for repairing defects in an internal layer 3 of a structure 5 for, for example, an aircraft.

This device 1 includes a rotating cylindrical body 7, a movement conversion means 9, a configuration means 11, and a cutting element 13.

Cylindrical body 7 rotates around its axial direction Z and has an opening 15 on its cylindrical surface.

Movement conversion means 9 is held in cylindrical body 7 and assembled such that it is able to move in the axial direction. In other words, movement conversion means 9 is coupled to cylindrical body 7 by a sliding connection L1 in axial direction Z. Thus, movement conversion means 9 is constrained to rotate with the cylindrical body 7.

Configuration means 11 is able to cause and to configure the displacement of conversion means 9 in a translational motion along the axial direction Z. In addition, configuration means 11 is able to cause and to configure the displacement of conversion means 9, independently of the displacement of device 1 in axial direction Z. It will be noted that the travelling motion can be configured mechanically or using a logical or digital encoding programmed in a processing means.

Figure 2A:
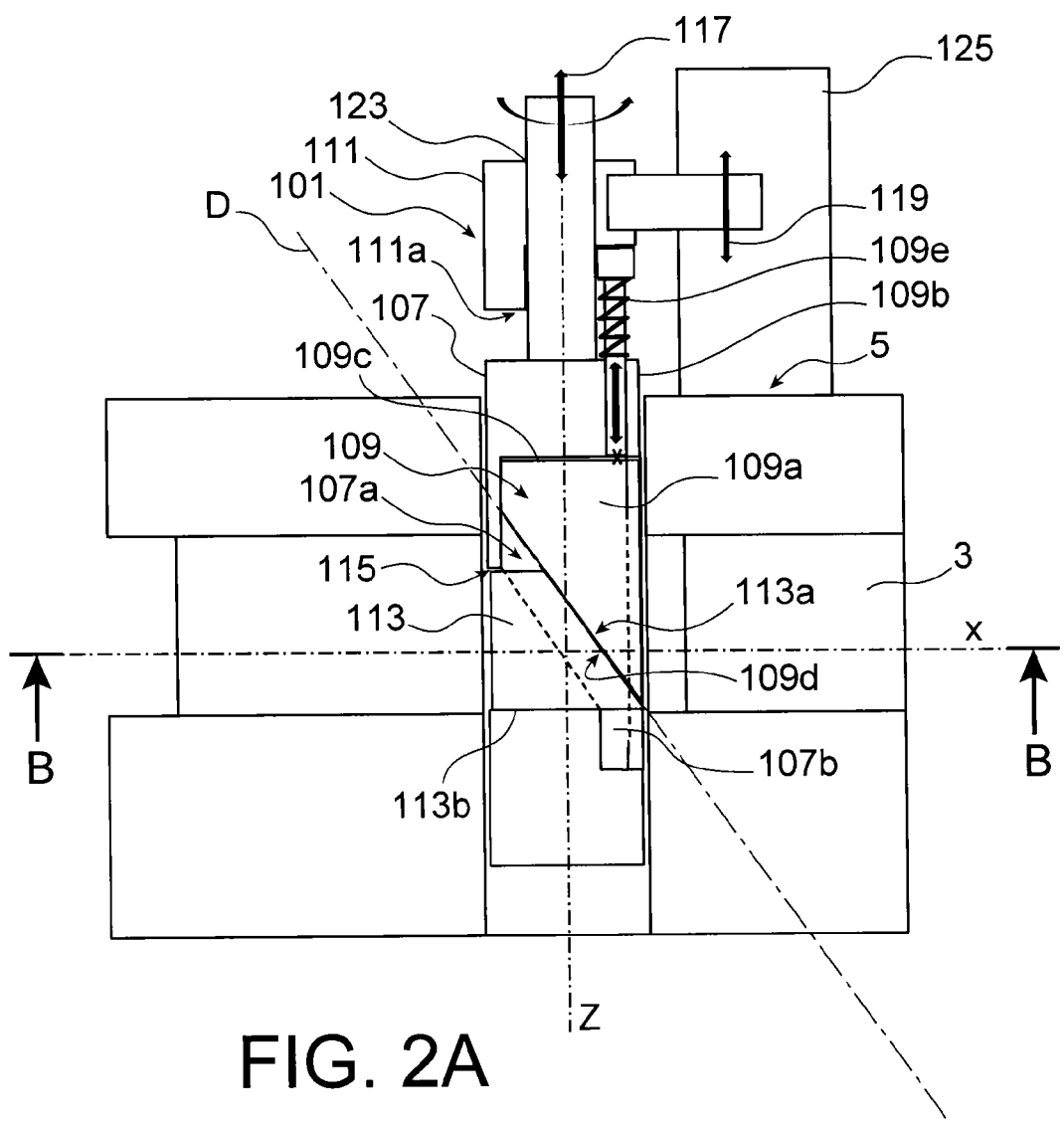
FIGS. 2A-2C illustrate schematically a crack-repair device according to a first embodiment of the invention.

Configuration means 11 is a mechanical configuration and driving part of cylindrical shape, which may be of variable thickness in the axial direction (see, for example, FIG. 2A). The configuration part can be free only in the axial direction, and pushed into contact against conversion means 9 such that when the latter rotates it can move with an axial travelling motion in accordance with the shape of the configuration part. Thus, internal layer 3 (in this case, the intermediate layer of a structure 5 consisting of three stacked layers) can be machined with a cut which depends on the shape of the configuration part.

According to a variant embodiment, configuration means 11 is a screw which can be rotated manually to translate conversion means 9 (see FIG. 5A).

Cutting element 13 is coupled by coupling means L2 to cylindrical body 7 and to conversion means 9 such that the cutting element may be made to rotate by cylindrical body 7 and subjected to a radial displacement (direction in the (X, Y) plane) by the conversion means between a folded or retracted position and a deployed position through opening 15 defined in cylindrical body 7. Cutting element 13 remains rigidly coupled such that it rotates with conversion means 9 of movement and cylindrical body 7. It will be noted that cutting element 13 in the folded position does not protrude beyond the radius of cylindrical body 7.

Thus, the rotating and travelling motion of cutting element 13 enables intermediate layer 3 to be machined with a cutting geometry which depends on the axial displacement of conversion means 9 as configured or programmed by configuration means 11.

Device 1, according to a variant embodiment, includes an adjustment means 17 to move cylindrical body 7 in axial direction Z in order to adjust cutting element 15 to a desired level compared with internal layer 3 which is to be machined.

In addition, device 1 includes a micrometric incrementation means 19 intended to generate successive increments to accomplish each of the thickness passes. Micrometric incrementation means 19 moves configuration part 11 towards conversion means 9 in axial direction Z, in accordance with the number of turns of cylindrical body 7. For example, an axial displacement of the order of a few micrometers is accomplished for each turn or for each number of determined turns of cylindrical body 7.

As an example, the diameter of cylindrical body 7 is of the order of 6 mm to 12 mm and it is of the order of 100 mm to 150 mm in length.

Thus, after having detected cracks, for example in an intermediate layer 3 of an inspection zone of structure 5 of the aircraft, device 1 is introduced into a hole 21 of this zone, the diameter of which may be of the order of 7 mm to 13 mm. The axial position of device 1 is adjusted with adjustment means 17, as far as a depth at which cutting element 13 is level with intermediate layer 3. After this, the rotation of cylindrical body 7 and the travelling motion of conversion means 9 make cutting element 13 rotate and impart a radial displacement to it, in order to machine only the defective area of intermediate layer 3, without machining the other layers. Cutting element 13 can be introduced laterally by 2 mm to 5 mm. After the cracks are eliminated, one or more inserts are introduced into the recess created by the machining to consolidate intermediate layer 3 (see FIGS. 4A-4D).

Figure 2B:
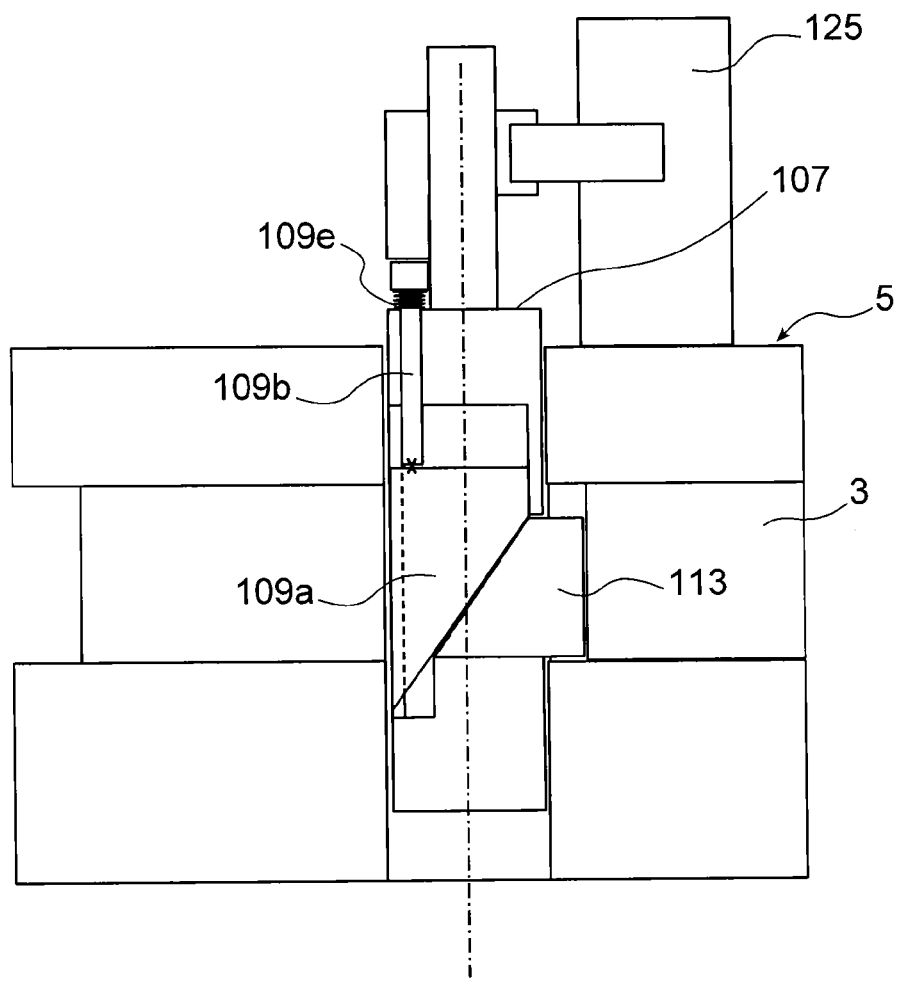
Figure 2C:
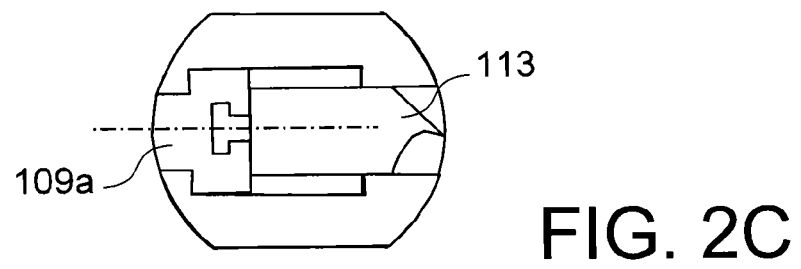

FIGS. 2A-2C illustrate schematically a defect-repair device 101 according to a first embodiment.

According to this first embodiment, device 101 includes a rotating cylindrical body 107, a movement conversion means 109, a cutting element 113, a configuration part 111, an adjustment means 117, and a micrometric incrementation means 119.

Rotating cylindrical body 107 has a lateral opening 115, and includes a cylindrical rod 123 in axial direction X. Cylindrical rod 123 facilitates the manual or automatic rotation of cylindrical body 107.

Conversion means 109 includes a piston or cylindrical pushrod 109*a* and a coupling rod 109*b*.

Cylindrical pushrod 109*a* has a first perpendicular base 109*c* (i.e. a flat base perpendicular to axial direction Z), and a second oblique base 109*d* (i.e. a flat base which is inclined relative to the axial direction). Cylindrical pushrod 109*a* is assembled such that it moves in cylindrical body 107 by means of a sliding connection to slide in axial direction Z in a cylindrical housing 107*a* of complementary shape. Cylindrical housing 107*a* is delimited on one side by a flat ceiling which is facing the first base 109*c* of cylindrical pushrod 109*a*, and on the other side by a flat base with a cavity 107*b* facing the second base 109*d* of cylindrical pushrod 109*a*. Cavity 107*b* is intended to receive a portion of cylindrical pushrod 109*a*.

Coupling rod 109*a* is free only in the axial direction relative to cylindrical body 107, and forms a punctiform joint between cylindrical pushrod 109*a* and configuration part 111. Coupling rod 109*a* is, indeed, positioned in cylindrical body 107 through a hole in the ceiling of cylindrical housing 107*a* such that its ends are in contact, firstly, with first base 109*c* of cylindrical pushrod 109*a* and, secondly, with configuration part 111. In addition, coupling rod 109*b* has a return spring 109*e* to remain in contact with cylindrical pushrod 109*a* and configuration part 111.

Cutting element 113 is coupled firstly with cylindrical pushrod 109*a* by a first sliding connection in a direction D which is inclined relative to axial direction Z, and secondly with cylindrical body 107 by a second sliding connection in a direction X which is perpendicular to axial direction Z.

FIG. 2C illustrates an example of the first sliding connection between cutting element 113 and cylindrical pushrod 109*a* according to a view BB (see FIG. 2A). According to this example, the assembly between cutting element 113 and cylindrical pushrod 109*a* is made T-shaped, giving a bilateral sliding connection providing five degrees of constraint, and only allowing travelling motion in direction D. As an example, the cutting element has a nozzle-shaped end which enables a large number of cutting shapes to be made.

The second sliding connection is formed by the coupling between cutting element 113 and opening 115 defined in cylindrical body 107.

More specifically, cutting element 113 includes a first inclined side 113*a* (of the same inclination as oblique base 109*d* of the cylindrical pushrod), and a second perpendicular side 113*b*. First inclined side 113*a* of cutting element 113 is coupled to second oblique base 113*a* of cylindrical pushrod 109*a* forming the first sliding connection. Second perpendicular side 113*b* of cutting element 113 is supported by the flat base of cylindrical housing 107*a*, whilst being coupled to opening 115 of cylindrical body 107 to form the second sliding connection. Thus, the displacement of cylindrical pushrod 109*a* in axial direction Z causes the radial displacement of cutting element 113 between the folded position (FIG. 2A) and the deployed position (FIG. 2B) or vice versa through opening 115.

Configuration part 111 takes the form of a ring suitable to be placed around cylindrical rod 123 of device 101. More specifically, configuration part or ring 111 is connected to a frame 125 and coupled to cylindrical body 107 by means of a sliding connection which allows the latter only a relative travelling motion in axial direction Z. Configuration ring 111 is of variable thickness in axial direction Z, thus enabling the travelling motion of cylindrical pushrod 109*a* to be configured. More specifically, the surface (called the lower surface, 111*a*) of one of the two coronal bases of ring 111 has a particular configuration, whereas the other can be flat.

Indeed, cylindrical pushrod 109*a* is pushed into contact against lower surface 111*a* of configuration ring 111 via coupling rod 109*b* and return spring 109*e* with a punctiform joint. Furthermore, the rotation of cylindrical body 107 causes that of cylindrical pushrod 109*a* which is rigidly mounted such that it rotates with it, without causing that of configuration ring 111 which is connected to it on frame 125. The relative rotation of cylindrical pushrod 109*a* relative to configuration ring 111, and the continuous and punctiform contact between the two elements, thus causes a travelling motion of cylindrical pushrod 109*a* in axial direction Z, equal to the thickness of configuration ring 111. This axial motion of cylindrical pushrod 109*a* is converted into a radial motion of cutting element 113 by means of the sliding connections between cutting element 113, firstly, and cylindrical pushrod 109*a* and cylindrical body 107, secondly.

FIG. 2A shows the case in which coupling rod 109*a* is in contact with the zone of configuration ring 111 having minimal thickness. In this case, return spring 109*e* is released, cylindrical pushrod 109*a* is in the highest position inside cylindrical housing 107*a* and, consequently, cutting element 113 is in the folded position inside cylindrical body 107.

Conversely, after a rotation of 180°, the example of FIG. 2B shows the case in which coupling rod 109*b* is in contact with the zone of configuration ring 111 having maximum thickness. In this case, return spring 109*e* is compressed, cylindrical pushrod 109*a* is in the lowest position inside cylindrical housing 107*a* and, consequently, cutting element 113 is outside cylindrical body 107 in its unfolded position with maximum amplitude.

Cutting element 113 can thus make a cutting profile in accordance with the geometrical shape of the lower surface 111*a* of configuration ring 111.

More specifically, configuration ring 111 has a thickness which can vary relative to the angular coordinates of its lower coronal surface 111*a* according to a periodic function of circular period from among multiple functions. The circular period functions can include triangle functions, sawtooth functions, rectangular functions of any shapes, sine functions, or others.

FIGS. 3A-3E illustrate several examples of geometrical shapes of a configuration ring 111 with the corresponding cutting profiles.

Each of references 112a-112e designates the shape of ring 111 according to section AA or, in other words, the projection of its axial portion over a circular period.

Figure 3A:
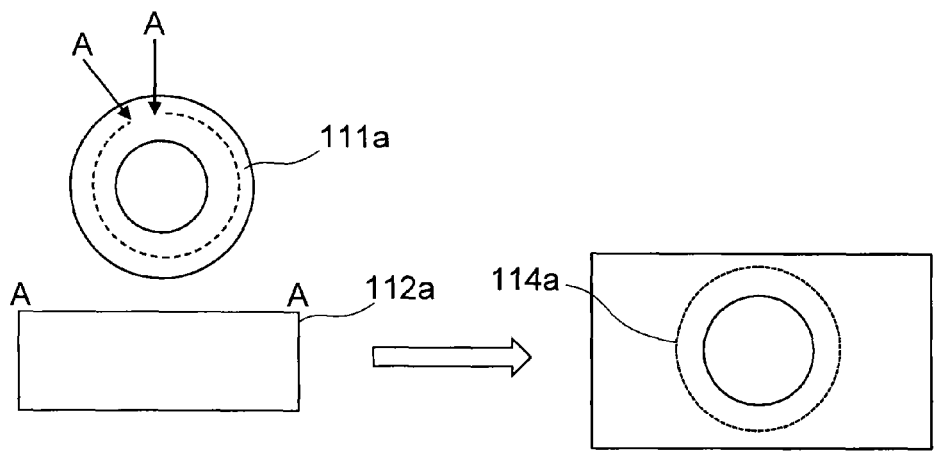
FIGS. 3A-3E illustrate several examples of geometrical shapes of a configuration ring with the corresponding cutting profiles, according to the invention.

FIG. 3A shows that a rectangular shape 112a of section AA causes a cut of circular shape 114a of a diameter which depends on the width of the rectangle. This type of cut is used to repair defects (for example cracks) detected anywhere on the wall of the cell.

Figure 3B:
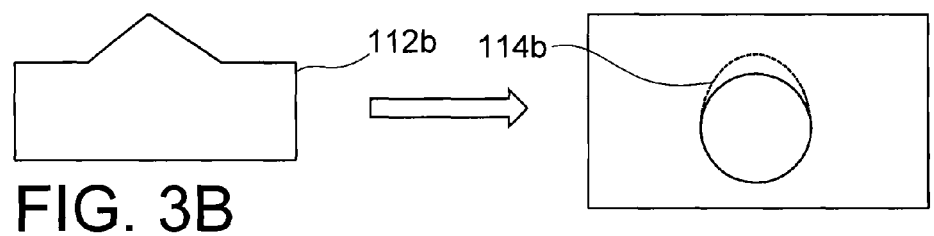

FIG. 3B shows that a rectangular shape surmounted by a triangle 112b of section AA causes a cut of semi-oval shape 114b. This type of cut is used to repair a crack detected in a side of the cell.

Figure 3C:
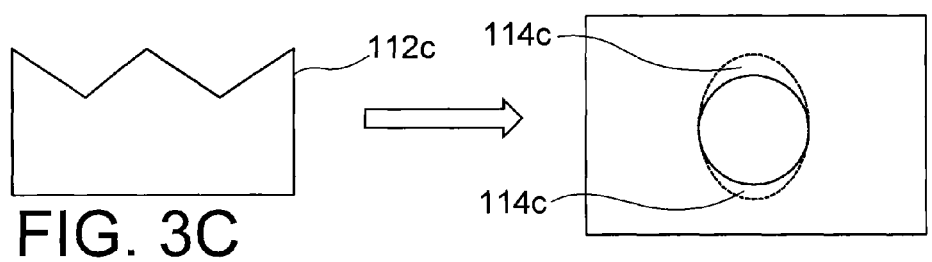

FIG. 3C shows that a sawtooth shape 112c of section AA causes a cut of oval shape 114c. This type of cut is used to repair a crack detected in two opposite sides of the cell.

Figure 3D:
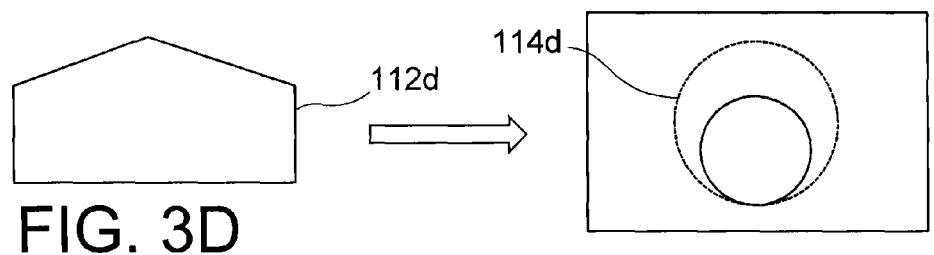
Figure 3E:
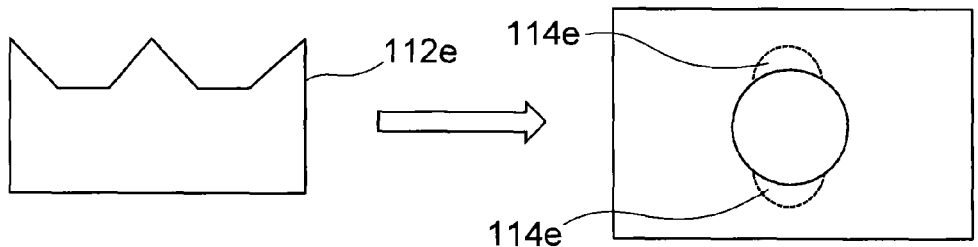

FIGS. 3D and 3E show still other shapes 112d, 112e of section AA with corresponding cuts 114d, 114e.

Naturally, it is possible to use a modular configuration ring of a suitable shape for any desired cutting profile.

To illustrate the operation of crack-repair device 101, cylindrical body 107 is inserted in the hole of structure 5 with cutting element 113 in its folded position. Configuration ring 111 which is suitable for the desired cut is positioned around cylindrical rod 123 and it is connected to frame 125 positioned at the hole. Adjustment means 119 is then used to move the cylindrical body in axial direction Z in order to adjust cutting element 113 to the desired level compared with the layer which is to be machined. The assembly is then rotated (manually or with a motor) to machine the zone to the desired height, and in accordance with configuration ring 111 used. Incrementation means 119 automatically moves configuration ring 111 in micrometric fashion towards cylindrical pushrod 109a in axial direction Z in accordance with the number of turns of the cylindrical body. It will be noted that with this device it is sufficient to have access to structure 5 only from a single side to machine any layer among multiple layers without machining the others, and at any height in the structure.

After machining, inserts are introduced into the recess created by the cut in order to complete the repair of the layer.

FIGS. 4A-4D illustrate several types of inserts 116a, 116b, 118a, 118d according to cutting profile 114a, 114b, 114d.

Figure 4A:
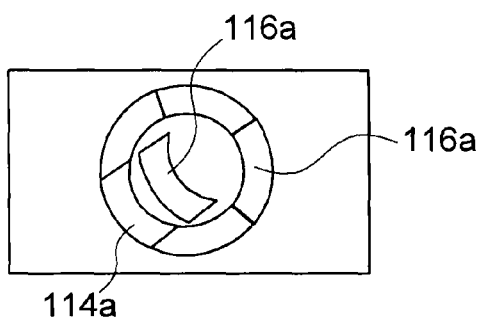
FIGS. 4A-4D illustrate inserts used to complete the repair of the cracks, according to the invention.
Figure 4B:
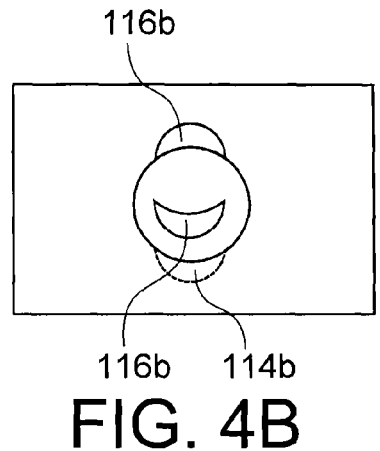
Figure 4C:
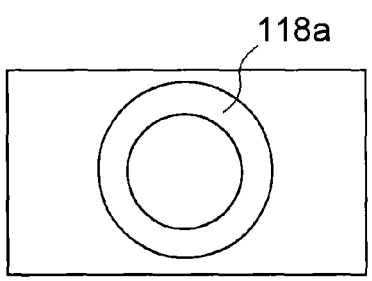
Figure 4D:
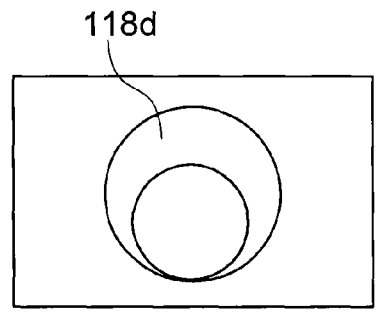

Inserts 116a, 116b used to fill machining recess 114a, 114b can be metal and made of several portions in order that they are able to pass through the hole (FIGS. 4A and 4B). This type of insert can be bonded when put in position, or removed after having been shrunk at low temperature, using liquid nitrogen, for example.

If inserts 118a, 118d are monobloc with a dimension greater than the diameter of the original hole (FIGS. 4C and 4D), they can then be cast directly in the machining recess using resin charged with fibres or metal powders, ceramic material, mineral resin, or a previously softened metal, etc.

FIGS. 5A and 5B illustrate schematically a crack-repair device 201 according to a second embodiment.

This device is distinguished from the one illustrated in FIGS. 2A and 2B principally by the fact that the configuration ring is replaced by a screw 211 installed on the side opposite cylindrical rod 223.

According to this second embodiment, device 201 includes a rotating cylindrical body 207 having an opening 215, a cylindrical pushrod 209, a configuration screw 211, and a cutting element 213.

Cylindrical pushrod 209 has a first perpendicular base 209a and a second oblique base 209b. Cylindrical pushrod 209 is assembled such that it moves in cylindrical body 207 by means of a sliding connection in order to slide in axial direction Z in a cylindrical housing 207a of complementary shape. Cylindrical housing 307a is delimited on one side by a flat base facing the first base 209a of the cylindrical pushrod 209, and on the other side by a flat ceiling provided with a cavity 207b facing the second base 209b of the cylindrical pushrod 209. Cavity 207b is intended to receive a portion of cylindrical pushrod 209.

Cutting element 213 is coupled firstly with cylindrical pushrod 209 by a first sliding connection in a direction which is inclined relative to axial direction Z, and secondly with cylindrical body 207 by a second sliding connection in a direction X which is perpendicular to axial direction Z.

Cutting element 213 includes a first inclined side 213a and a second perpendicular side 213b. First inclined side 213a of cutting element 213 is coupled to second oblique base 209b of cylindrical pushrod 209 forming the first sliding connection. Second perpendicular side 213b of cutting element 213 is supported by the flat ceiling of cylindrical housing 207a and is coupled to opening 215 defined in cylindrical body 207 to form the second sliding connection. The displacement of cylindrical pushrod 209 in axial direction Z thus causes the radial displacement of cutting element 213 between the folded position (FIG. 5A) and the deployed position (FIG. 5B) or vice versa through opening 215.

The axial displacement of cylindrical pushrod 209 is accomplished by configuration screw 211, in order to push or pull cylindrical pushrod 209.

Indeed, configuration screw 211 passes through the flat ceiling of cylindrical housing 207a and makes contact with cylindrical pushrod 209 such that a rotation in one direction or another of screw 211 causes an axial displacement of cylindrical body 209 in a corresponding direction.

Thus, by turning firstly screw 211 in a clockwise direction, cylindrical pushrod 209 is pushed upwards, which in turn will push cutting element 213 through opening 215 and bring it into contact with the wall of layer 3. After this, by rotating device 201 by cylindrical rod 223 incorporated in cylindrical body 207, cutting element 213 can rotate in order to machine layer 3. By rotating screw 211 in the opposite direction, cylindrical pushrod 209 comes back down, bringing cutting element 213 inside cylindrical body 207. By adjusting configuration screw 211 the profile of the desired cut can thus be configured.

Figure 6B:
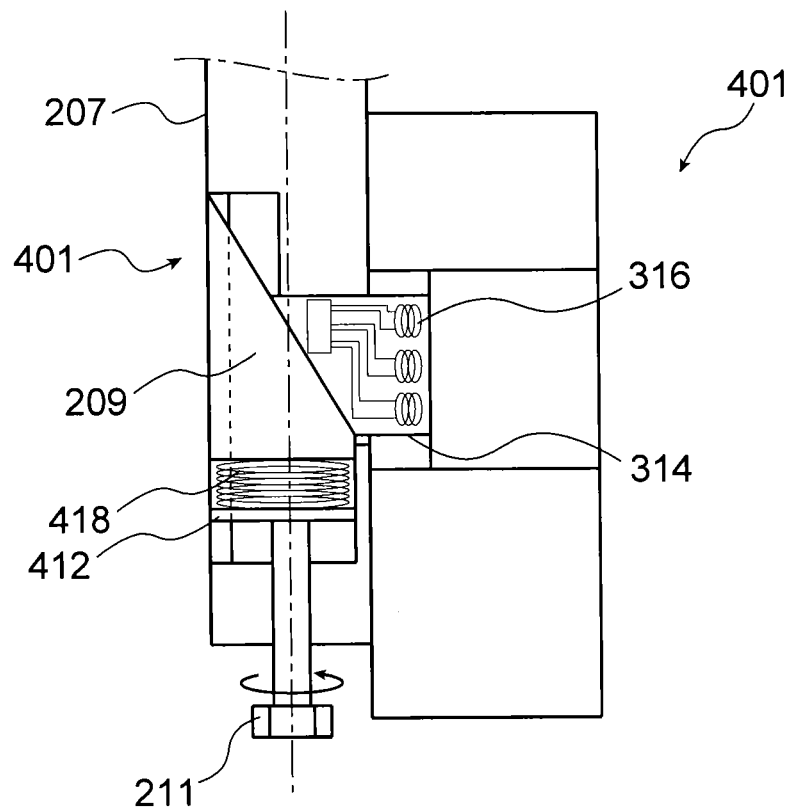
Figure 7:
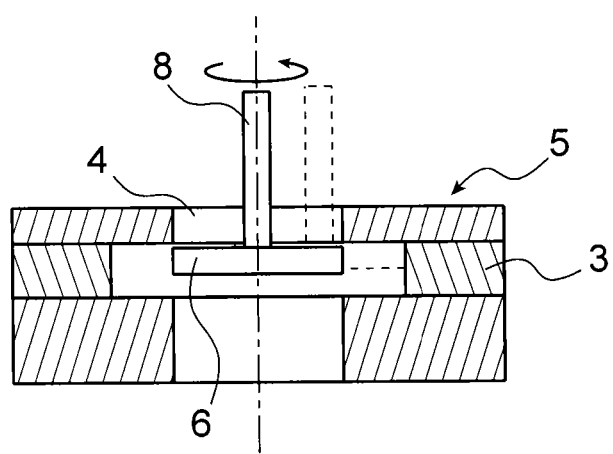
FIG. 7 illustrates schematically a crack-repair device, according to the prior art.

FIGS. 6A and 6B illustrate schematically a defect-detection device 301 according to the invention.

Indeed, detection device 301 of FIG. 6A is similar to that of FIG. 5A, except that the cutting element has been replaced by a part of the same shape and including a crack-detection sensor 314.

As an example, sensor 314 includes a network of small detection coils 316. Coils 316 are connected in parallel, in order that they may be processed individually as multiple detectors by eddy currents. As an example, each coil must have a diameter of approximately 0.5 mm to 1 mm, and a height of approximately 1 mm to several mm. Thus, the diameter of the coils may be made appropriate for the smallest defect which must be detected, habitually of the order of 1 mm, and even enables cracks of less than 1 mm to be detected.

It will be noted that the data taken from sensor 314 can be transmitted to a reception device (not represented) by a wired or wireless connection.

FIG. 6B illustrates schematically a defect-detection device 401 according to a variant of that of FIG. 6A.

According to this variant, when screw 211 passes through the flat base of the cylindrical housing it comes into contact with cylindrical pushrod 209 through a circular plate 412 with a spring 418. Plate 412 enables the force derived from screw 211 to be distributed uniformly over the entire flat base of cylindrical pushrod 209, and spring 418 enables a pressure to be exerted to maintain sensor 314 in contact with the wall of layer 3.

Thus, depending on the geometry of the hole, one or other of the variants may be used.

In the case of cells of random shape, it is advantageous to use the variant of FIG. 6B since sensor 314 is held in contact with the wall of layer 3 by the pressure exerted by spring 418. In this case, device 401 will be rotated manually, and slowly, in order to allow sensor 314 to be adjusted to a ridge or undulation of the wall which is to be inspected.

In the case of cells of cylindrical shape, the variant of FIG. 6A can be used, since the force exerted by configuration screw 211 is sufficient to hold sensor 314 in contact with the surface which is to be inspected.

The invention claimed is:

1. A device for repairing defects in an internal layer of a structure, wherein the said device includes:
   a cylindrical body rotating around its axial direction,
   a movement converter held in the said cylindrical body, said movement converter being constrained to rotate with the cylindrical body, and assembled such that said movement converter is able to move in the axial direction,
   a configuration part able to cause and to configure the displacement of said movement converter in an axial translational movement,
   a cutting element coupled with the said cylindrical body and with said movement converter such that the cutting element may be made to rotate by the cylindrical body, and may be made to move with a radial displacement by the movement converter between a folded position and a deployed position through an opening defined in said cylindrical body to machine the internal layer with a cut which depends on the displacement of said movement converter according to an axial translational movement, said cutting element being enclosed in said cylindrical body in said folded position.

2. The device according to claim 1, further comprising an adjustment means to move the cylindrical body in the axial direction in order to adjust the cutting element to a desired level compared with the internal layer which is to be machined.

3. The device according to claim 1, wherein the configuration part has cylindrical shape, and is of variable thickness in the axial direction, and wherein said configuration part is connected to a frame whilst being coupled to the cylindrical body with a sliding connection in the axial direction, where the said movement converter is pushed into contact with a punctiform joint with said configuration part, such that, when said movement converter rotates, the movement converter can move with an axial travelling motion in accordance with the shape of said configuration part.

4. The device according to claim 3, wherein the device includes an incrementation means to move the configuration part in micrometric fashion towards the movement converter in an axial direction, in accordance with the number of turns of the cylindrical body.

5. The device according to claim 1, wherein the movement converter includes:
   a cylindrical pushrod having a first perpendicular base and a second oblique base, where said cylindrical pushrod is able to slide in a cylindrical housing of complementary shape, delimited on one side by a ceiling which is flat compared with the first base, and on another side by a flat base with a cavity compared with the second base, where said cavity is to receive a portion of said cylindrical pushrod, and
   a coupling rod passing through a hole of said ceiling, the ends of which are in contact firstly with the first base of the cylindrical pushrod, and secondly with the configuration part, where the coupling rod includes a return spring to remain in contact with the cylindrical pushrod and the configuration part.

6. The device according to claim 5, wherein the cutting element has a first inclined side coupled to the second oblique base of the cylindrical pushrod by a first sliding connection, and a second perpendicular side supported on the said flat base of the cylindrical housing, and coupled by a second sliding connection to the opening defined in the cylindrical body such that the displacement of the cylindrical pushrod in the axial direction causes a radial displacement of the cutting element between a folded position and a deployed position, or vice versa through the said opening.

7. The device according to claim 1, wherein the cylindrical body includes a cylindrical rod in the axial direction.

8. The device according to claim 7, wherein the configuration part is a configuration ring suitable to be placed around the said cylindrical rod.

9. The device according to claim 8, wherein the configuration ring is of a thickness which can vary relative to the angular coordinates of the ring according to a determined function among one of the following functions: triangle function, sawtooth function, rectangular function, and sine function.

10. The device according to claim 1, wherein the movement converter is a cylindrical pushrod having a first perpendicular base and a second oblique base, where said cylindrical pushrod is able to slide in a cylindrical housing of complementary shape, delimited by a base, said base being flat compared with the first base and a flat ceiling having a cavity compared with the second base, where said cavity is to receive a portion of said cylindrical pushrod.

11. The device according to claim 10, wherein the cutting element has a first inclined side coupled to the second inclined base of the pushrod by a first sliding connection, and a second perpendicular side supported on the said flat ceiling of the cylindrical housing and coupled to the opening defined in the cylindrical body by a second sliding connection, such that the displacement of the cylindrical pushrod in the axial direction causes a radial displacement of the cutting element between a folded position and a deployed position, or vice versa through the said opening.

12. The device according to claim 10, wherein the configuration part is a configuration screw passing through the flat base of the cylindrical housing and making contact with said cylindrical pushrod such that a rotation of said screw causes an axial displacement of said cylindrical body.

13. The device according to claim 10, wherein the cutting element is replaced by a crack-detection sensor.

* * * * *